3,574,513
PRINTING AND DYEING PROCESS
Walther Wolf, Leverkusen, Johannes Eibl, Burscheid-Kaltenherberg, and Karl Wojatschek, Cologne-Dellbrueck, Germany, assignors to Farbenfabriken Bayer Aktiengesellschaft, Leverkusen, Germany
No Drawing. Filed Apr. 10, 1969, Ser. No. 815,191
Claims priority, application Germany, Apr. 20, 1968,
P 17 69 210.3
Int. Cl. D06p 5/00, 5/04
U.S. Cl. 8—4                                   1 Claim

ABSTRACT OF THE DISCLOSURE

Cellulose ester and linear polyesters are dyed with disperse dyes from a bath containing N-substituted phthalimides. Alkyl, hloalkyl, acyloxyalkyl, carboxyalkyl alkoxy carbonyl and alkoxy alkyl radicals substituted on the N-group of the phthalimide are examples of the phthalimide.

---

The present invention relates to a process for the dyeing or printing of products obtained from polyesters or cellulose esters with disperse dyestuffs; more particularly it concerns a process wherein the dyeing or printing is carried out in the presence of phthalimide derivatives of the formula

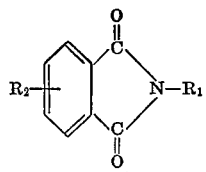

I in which $R_1$ stands for an alkyl radical optionally substituted by halogen, by a hydroxy, acyloxy, carboxy or alkoxycarbonyl group and containing altogether 1 to 8 carbon atoms, the carbon chain of which may be interrupted by oxygen atoms; and $R_2$ represents hydrogen, halogen, a hydroxy, $C_1$-$C_4$-alkoxy, carboxy, $C_1$-$C_4$-alkoxycarbonyl or a nitro group, or a phenyl radical.

The following alkyl radicals may be mentioned for $R_1$, for example; methyl, ethyl, propyl, isopropyl, butyl, isobutyl, 2-ethylhexyl, ethoxymethyl, propoxymethyl, 3-hydroxypropyl-(1), 3-chloro-propyl-(1), 3-methoxypropyl-(1), 2-acetoxyethyl - (1), 3 - propionyloxypropyl - (1), 3-methoxy-carbonylpropyl-(1) and the 5 - ethoxycarbonyl-pentyl-(1) radical.

The following $C_1$-$C_4$-alkoxy groups may be mentioned for $R_2$, for example, the methoxy-, ethoxy-, propoxy-, isopropoxy- and the butoxy-group; $C_1$-$C_4$-alkoxycarbonyl groups are the methoxy-carbonyl, ethoxycarbonyl, propoxycarbonyl, isopropoxycarbonyl and butoxycarbonyl group.

Representative examples of the phthalimide derivatives of the Formula I to be used according to the invention are the following: N-ethyl-phthalimide, N-isopropyl-phthalimide, N-butyl-phthalimide, N-isobutyl-phthalimide, N-(2-ethyl-hexyl)-phthalimide, N - ethoxymethyl-phthalimide, N-propoxy-methyl-phthalimide, N-(3-hydroxypropyl)-phthalimide, N-(3-methoxypropyl)-phthalimide, N-acetoxyethyl-phthalimide, N - (3 - propionyloxy-propyl)-phthalimide, 4-phthalimido-butyric acid methyl ester, 6-phthalimidocaproic acid ethyl ester, furthermore the corresponding N-derivatives of 3- and 4-chloro-phthalic acid imide, 3- and 4-nitro-phthalic acid imide as well as of 4-phenyl-, 4-hydroxy-, 4-methoxy-, 4-ethoxy-, 4-methoxycarbonyl- and 4-ethoxycarbonyl-phthalic acid imide.

The phthalimide derivatives of the Formula I to be used according to the invention can be obtained by known methods.

The necessary amounts of the phthalimide derivatives of the Formula I to be used according to the invention can readily be determined in each case by preliminary experiments. In general, amounts of 1-6 g. for each litre of dyeing liquor in the customary goods-to-liquor ratios of 1:2 to 1:40, or 1-15 g. for each kilogram printing paste, have proved satisfactory.

The phthalimide derivatives to be used according to the invention can also be used in admixture with other dyeing accelerators, such as esters of alkyl groups containing salicylic acids, e.g. cresotinic acid methylester or ether esters of dihydroxy benzoic acid, e.g. 3-methoxy-5-hydroxy-benzoic acid methylester and 3-methoxy-4-hydroxy-benzoic acid ethylester. The same quantities of such mixtures are used as those of the phthalimide derivatives alone.

The phthalimide derivatives of the Formula I to be used according to the invention are advantageously be used together with ionic or non-ionic emulsifiers or dispersing agents. The quantities of emulsifiers or dispersing agents expediently amount to 5-15% of the weight of the phthalimide derivative.

The disperse dyestuffs used for the dyeing process according to the invention are the disperse dyestuffs customarily used for the dyeing of polyesters and cellulose esters, as are described, for example, in "Colour Index" vol. 1, pages 1655-1742, 2nd edition (1956).

The dyeing or printing of the products consisting of polyesters or cellulose esters in the presence of the phthalimide derivatives according to the invention is carried out according to the methods usual for the dyeing and printing with disperse dyestuffs; such methods comprise the conventional methods operating at 98° C., the high-temperature and the thermosol method.

With the aid of the process according to the invention it is possible to dye products, e.g. filaments, fibres, woven and knitted fabrics, films and foils of polyesters, such as polyterephthalic acid glycol esters, and of cellulose esters, e.g. celluose triacetate, with disperse dyestuffs in deep shades and with outstanding uniformity.

The structures of the dyestuffs chracterized by the numbers I-III are given in the table following the examples.

EXAMPLE 1

Yarns of polyterephthalic acid glycol ester are introduced, in a goods-to-liquor ratio 1:40, into a bath heated to 60° C. and adjusted to a pH value of 4.5 with sulphuric acid, which contains, per litre.

0.375 g. of the dyestuff I,
0.45 g. of the dyestuff II,
1.67 g. of the dyestuff III,
4 g. of N-butylphthalimide, and
1 g. of a mixture (A) prepared from equal parts of the phenyl polyglycol ether obtained by the reaction of 5-7 mol ethylene oxide with 1 mol nonylphenol, and the monohydroxyethyl ammonium salt of benzene-sulphonic acid.

The bath is heated to 98° C. within 45 minutes and kept at this temperature for 120 minutes. The yarns are then rinsed with water and subsequently introduced, in a goods-to-liquor ratio 1:40, into an after-treatment bath at 40° C. which contains, per litre, 2 ml. of a sodium hydroxide solution 38° Bé, 5 g. sodium dithionite and 1 g. of the sodium salt of a mixture of paraffin sulphonic acids with a mean chain length of $C_{15}$. The bath is heated to 70° C. within 20 minutes. The yarns are then rinsed with fresh water, neutralised with formic acid and again rinsed with water. A deep, uniform dark grey dyeing is obtained.

A dark grey dyeing of the same uniformity is obtained by using, instead of N-butyl-phthalimide, the same quantity of N-isopropyl-phthalimide.

EXAMPLE 2

A knitted fabric of texturized polyterephthalic acid glycol ester is introduced, in a goods-to-liquor ratio 1:20, into bath at 60° C. adjusted to a pH value of 4.5 with sulphuric acid and containing, per litre, 0.375 g. of the dyestuff I,
0.45 g. of the dyestuff II,
1.67 g. of the dyestuff III,
4 g. of a mixture consisting of 4 parts by weight N-butyl-phthalimide and 1 part of weight 2-hydroxy-3-methoxy-benzoic acid methyl ester, and
1 g. of the mixture (A) described in Example 1.

The bath is heated to 130° C. within 45 minutes and kept at this temperature for 90 minutes. The knitted fabric is then rinsed with water and subsequently introduced into an after-treatment bath at 40° C. containing, per litre, 2 ml. of a sodium hydroxide solution (38° Bé), 5 g. sodium dithionite and 1 g. of the sodium salt of a paraffin sulphonic acid mixture with a mean chain length of $C_{15}$. The bath is heated to 70° C. within 20 minutes. The knitted fabric is then rinsed with fresh water, the sodium hydroxide solution neutralised with formic acid and the fabric again rinsed with water. A deep, uniform dark grey dyeing free of streaks is obtained.

EXAMPLE 3

A fabric of polyterephthalic acid glycol ester is padded with a liquor which contains, per litre, 20 g. of the dyestuff III,
4 g. of 4-methoxycarbonyl-N-methoxyethyl-phthalimide,
2 g. of the mixture (A) described in Example 1, and
3 g. alginate (dry substance).

The fabric is then squeezed out to a residual moisture of 60%, dried in full width and subsequently subjected to the thermosol process at 210° C. for 30 seconds. After cooling, the fabric is subjected to the alkaline-reducing after-treatment with a sodium hydroxide solution/sodium dithionite described in Example 1. An excellent uniform blue dyeing is obtained.

EXAMPLE 4

Yarns of cellulose triacetate are introduced, in a goods-to-liquor ratio 1:40, into a bath heated to 60° C. and adjusted to a pH value of 4.5 with sulphuric acid, which contains, per litre, 0.375 g. of the dyestuff I,
0.45 g. of the dyestuff II,
1.67 g. of the dyestuff III,
4 g. N-propoxy-methyl-phthalimide, and
1 g. of the mixture (A) described in Example 1.

The bath is heated to 98° C. within 45 minutes and kept at this temperature for 120 minutes. The yarn is then removed from the dyebath and treated at 50° C. for 15 minutes, in a goods-to-liquor ratio 1:40, with an aqueous solution containing 1 g. of the Na salt of a paraffin sulphonic acid mixture with a mean chain length of $C_{15}$ and the yarn is subsequently rinsed with cold water. A dark grey dyeing of outstanding uniformity and very good fastness properties is obtained.

A dark grey dyeing of the same uniformity is obtained when, instead of N-propoxymethyl-phthalimide, an equal amount of N-tert.-butyl-phthalimide is used.

Structures of the dyestuffs I–III used in the examples

I
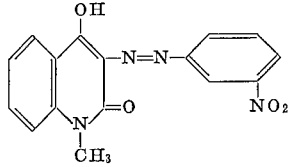

II

III
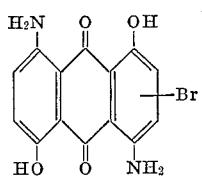

We claim:
1. Process for dyeing textiles or foils of linear polyesters or cellulose esters with dispersed dyes which comprises applying to said textiles or foils a dispersed dyestuff composition containing a phthalimide of the formula

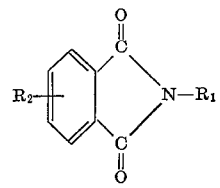

in which $R_1$ is a radical containing 1–8 carbon atoms and is a radical selected from the group consisting of alkyl, haloalkyl, hydroxyalkyl, alkanoyl oxyalkyl carboxy alkyl, alkoxycarboxyl alkyl and alkoxy alkl and $R_2$ is a radical from the group consisting of hdrogen, halogen, hydroxy, alkoxy, alkoxy carbonyl, nitro or phenyl wherein the alkyl groups of said alkoxy or alkoxy carbonyl radicals contain 1 to 4 carbon atoms.

References Cited

UNITED STATES PATENTS 3,386,795  6/1968  Caldwell et al. _____ 8—100

FOREIGN PATENTS 13,798  1962  Japan _____ 8—171
324,162  1957  Switzerland _____ 8—171

DONALD LEVY, Primary Examiner

U.S. Cl. X.R.
8—171, 172